UNITED STATES PATENT OFFICE.

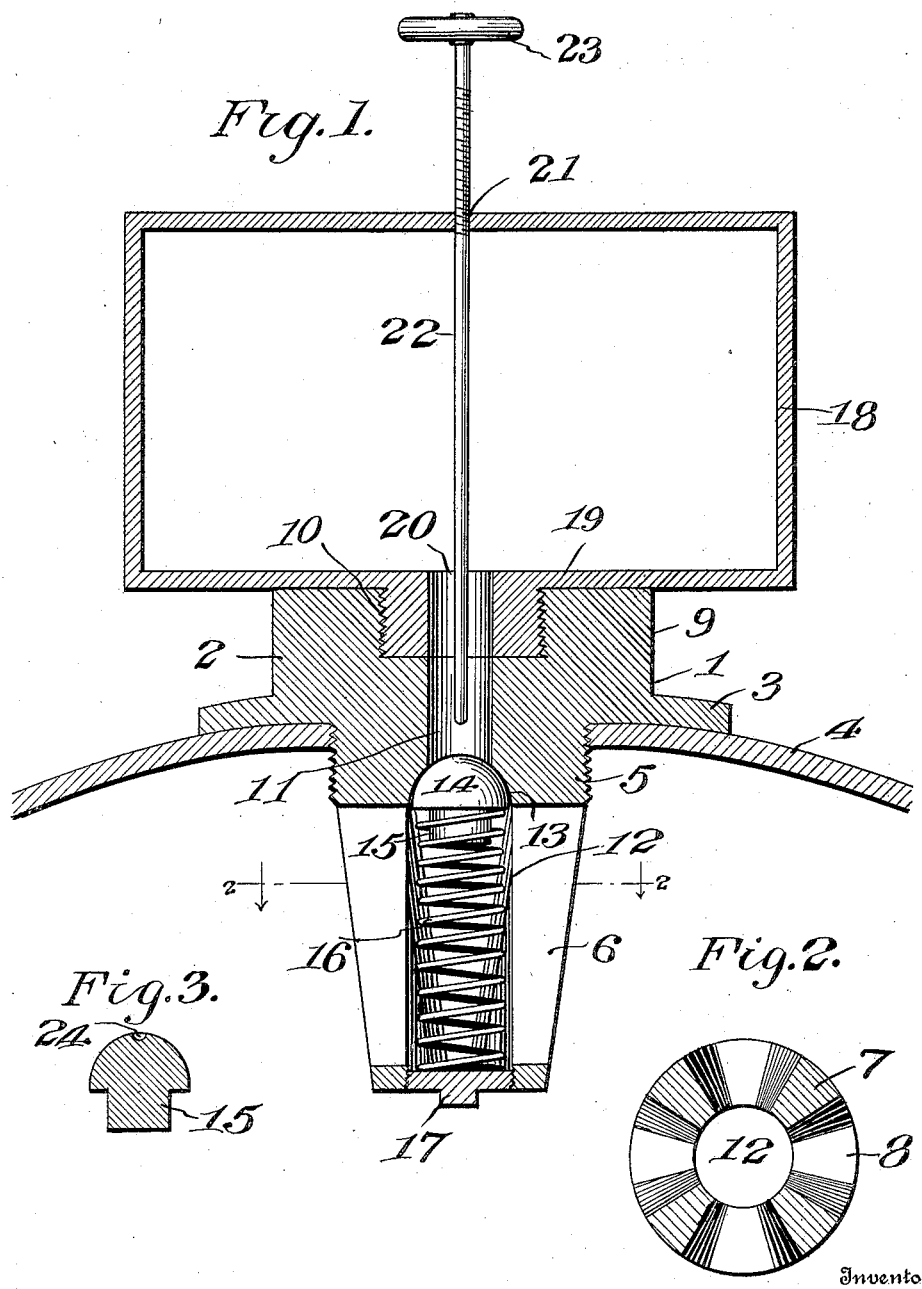

JOHN W. CUMLEY, OF ATCHISON, KANSAS, ASSIGNOR OF ONE-SIXTH TO H. L. JONES AND ONE-SIXTH TO P. R. MANDERVILLE, OF ATCHISON, KANSAS, AND ONE-SIXTH TO F. W. MOORE, OF GREENLEAF, KANSAS.

CHECK-VALVE.

988,175.     Specification of Letters Patent.     Patented Mar. 28, 1911.

Application filed April 3, 1909. Serial No. 487,619.

*To all whom it may concern:*

Be it known that I, JOHN W. CUMLEY, a citizen of the United States, residing at Atchison, in the county of Atchison and State of Kansas, have invented new and useful Improvements in Check-Valves, of which the following is a specification.

The invention relates to an improvement in check valves for boilers or the like, being particularly directed to a check valve which, in the event of breakage in the boiler connection, will automatically close to prevent escape of steam from the boiler.

The main object of the present invention is the provision of a check valve which can be readily applied to any part of the boiler and which is constructed to include the normally closing valve element adapted to be held in an open position by a manually operable member.

The invention will be described in the following specification, reference being had particularly to the accompanying drawings, in which:—

Figure 1 is a sectional view illustrating the application of the improved check valve to a boiler structure. Fig. 2 is a section on line 2—2 of Fig. 1. Fig. 3 is a vertical section of the valve proper.

Referring particularly to the accompanying drawings, my improved check valve comprises a plug 1 formed to provide a main body section 2, which includes a laterally projecting base plate 3, which, when the plug is in position rests squarely upon the outer surface of the boiler shell 4. Below the base plate the plug is formed with a centrally arranged exteriorly threaded extension 5, and below said extension in the form of a cage 6. The cage, as is usual, is of circular shape in section and made up of a series of vertically spaced ribs or bars 7 arranged to provide intermediate openings 8 for the free admission of the particular fluid to the cage.

Above the base plate 3 of the body there is provided a circular extension 9, having a diameter exceeding that of the extension 5, the extension 9 being centrally formed with a threaded opening 10 which extends part way therethrough. The valve plug is formed with a longitudinal channel 11, which at the upper end communicates with the opening 10 and at the lower end with the longitudinal opening 12 in the cage, said channel 11 being of less diameter than the cage opening. In the lower surface of the extension 5, concentric with the channel 11, the material of the extension is appropriately cut away to provide a valve seat 13, which valve seat is approximately of semispherical construction. A valve proper 14 of a semispherical shape to fit the seat 13 is mounted in the longitudinal opening of the cage, having a cylindrical extension 15 to receive one end of a coil spring 16, the opposite end of which bears against a heading disk 17 threaded in the bottom of the cage and in the cage opening 12 in said bottom. The spring is tensioned to normally maintain the valve in closed position, as will be apparent from Fig. 1 of the drawings.

The particular boiler connection with which the valve is to be used is designed to be secured to the improved check valve through the medium of the threaded opening 10, as for example a fountain 18 is illustrated for the injector connections (not shown), and said fountain is formed with an extension 19 exteriorly threaded to snugly fit in the opening 10. Said extension is formed with a longitudinally extending port 20 alining with the channel 12 in the check valve to establish communication with the fountain and the interior of the boiler through the check valve.

At a point in alinement with the opening 20 the fountain is formed with a threaded opening 21 to receive an operating rod 22 threaded for coöperation with the opening 21 and formed at the upper or free end with a hand wheel 23. At the inner or lower end the rod is formed for engagement with a semicylindrical depression 24 in the valve proper, whereby in suitably operating the rod 22 the valve 14 may be forced downward and held in spaced relation to its seat to permit uninterrupted communication between the interior of the boiler and the fountain.

In the event of breakage of the connection it will be obvious that the operating rod 22 will be removed from coöperative relation with the valve 14, thereby permitting said valve to automatically close the outlet from the boiler. The spring 16 serves to insure an instantaneous closure of the valve, it being obvious, however, that if desired said spring may be dispensed with as the steam pressure alone from the boiler will serve to seat the valve.

An essential feature of the present invention resides in the construction of the check valve so that it may be readily applied to the boiler with the valve proper located wholly within the boiler, thereby precluding liability of breakage to the valve proper except under circumstances where the entire boiler is disrupted. It is, of course, understood that the improved check valve is designed for use with any steam connections leading from the boiler, and when in use will instantly shut off the escape in the event of breakage of such connection. The valve is readily applied to any boiler and in fact in commercial form will be designed to fit the usual tap hole in the boiler for the particular connection and to also receive such connection.

Having thus described the invention what is claimed as new, is:—

A check valve comprising a plug formed to provide a main body section having a base plate to overlie and bear upon the boiler shell, said body section including a threaded extension arranged for threaded connection with an opening formed in the boiler shell, said body further including a cage projecting below the extension and wholly within the boiler shell, said body being formed with a steam opening extending therethrough and in communication with the cage, the body at the juncture of the cage and extension being formed to provide a valve seat, a spring-pressed valve operative within the cage to coöperate with the seat, that surface of the body beyond the boiler shell being formed with a threaded recess of less diameter than the body extension, a fountain formed with a threaded extension to engage the threaded recess in the body, said fountain extension being formed with an opening to aline with the steam opening in the body, and a rod threaded through one wall of the fountain with its free end arranged for coöperation with the valve.

In testimony whereof I affix my signature in presence of two witnesses.

JOHN W. CUMLEY.

Witnesses:
HERBERT L. JONES,
FRED W. MOORE.

---

Copies of this patent may be obtained for five cents each, by addressing the "Commissioner of Patents, Washington, D. C."